Dec. 18, 1934.  E. C. BRITTON ET AL  1,984,725
TREATMENT OF CHLORINATED ISOBUTANE
Filed Dec. 14, 1932
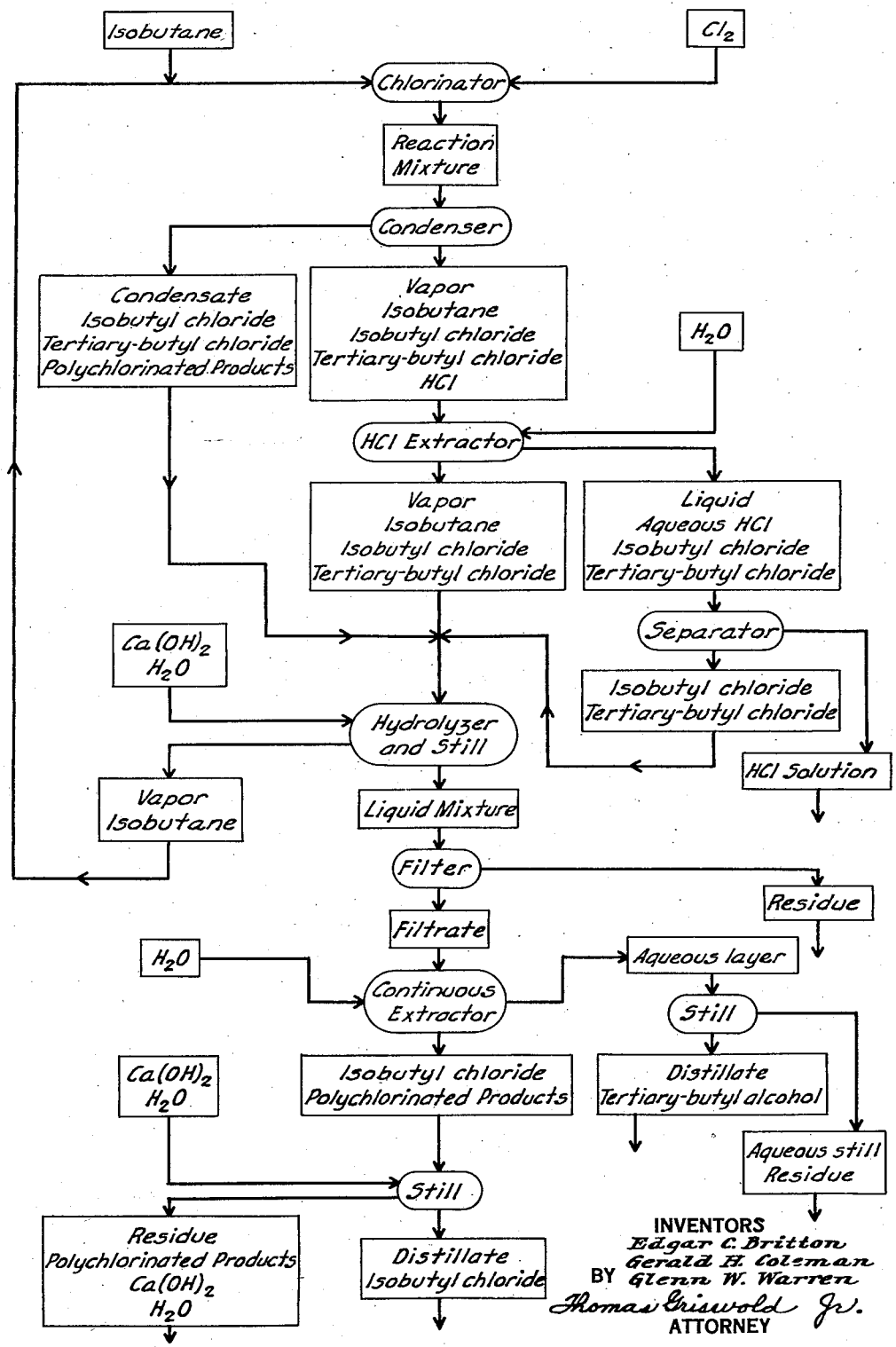

Patented Dec. 18, 1934

1,984,725

UNITED STATES PATENT OFFICE 1,984,725

TREATMENT OF CHLORINATED ISOBUTANE

Edgar C. Britton, Gerald H. Coleman, and Glenn W. Warren, Midland, Mich., assignors to The Dow Chemical Company, Midland, Mich., a corporation of Michigan Application December 14, 1932, Serial No. 647,178

20 Claims. (Cl. 260—156)

The invention relates to a method of hydrolyzing tertiary-butyl chloride. It more particularly concerns a method of working up a mixture containing isobutyl and tertiary-butyl chlorides, such as is obtained by chlorinating isobutane, the method involving the selective hydrolysis of the tertiary-butyl chloride in the mixture and the subsequent separation of the resulting tertiary-butyl alcohol from the unreacted isobutyl chloride.

During the vapor phase chlorination of isobutane according to usual methods, a complex and difficultly separable reaction mixture is formed containing hydrogen chloride, unreacted isobutane, isobutyl chloride, and tertiary-butyl chloride along with relatively small quantities of polychlorinated products, isobutylene, and chloro-isobutylenes. The chlorinated products, which normally are liquid, can be condensed or otherwise separated from gaseous components of the mixture (e. g. isobutane, hydrogen chloride, and isobutylene), but the isobutyl and tertiary-butyl chlorides cannot readily be separated as individual compounds from such liquid mixture.

The aforesaid monochlorinated products have freezing points far below 0° C., hence fractional crystallization methods of separation are too costly for commercial practice. In fractionally distilling the liquid chlorinated mixture the isobutyl and tertiary-butyl chlorides tend to distill together, so that a complete separation of the isomers is extremely difficult to attain. Furthermore, if such fractional distillation is carried out in metallic apparatus, a portion of the polychlorinated isobutane products (e. g. dichloroisobutanes) is decomposed into hydrogen chloride and chloro-isobutylenes and a considerable portion of the tertiary-butyl chloride usually is decomposed into isobutylene and hydrogen chloride. Still further, the chloro-isobutylenes which are formed during both the chlorination and the distillation steps tend to be distributed throughout the various distillation fractions.

In a co-pending application of E. C. Britton, G. H. Coleman and B. C. Hadler, Serial No. 636,996, filed October 10, 1932, an improved method of chlorinating isobutane is disclosed, whereby the formation of isobutylene and of chloro-isobutylenes is substantially avoided and isobutyl and tertiary-butyl chlorides are formed in high yield, accompanied by relatively small quantities of polychlorinated products. By fractionally distilling the liquid products from such chlorination, the quantity of chloro-isobutylenes obtained in the distillate is, of course, reduced, but traces of chloro-isobutylenes may be formed from the polychlorinated products during such distillation and all of the other difficulties previously mentioned are encountered. Even with such relatively simple chlorination mixture, then, the monochlorinated products cannot economically be isolated by usual methods.

We have now found that a chlorinated isobutane mixture containing isobutyl and tertiary-butyl chlorides can be treated with an aqueous solution or slurry of an alkaline earth metal hydroxide to hydrolyze selectively the tertiary-butyl chloride contained therein without appreciably effecting the isobutyl chloride, that the resulting tertiary-butyl alcohol can readily be separated from the isobutyl chloride and that the so separated compounds can be purified by simple means.

We prefer to employ a calcium hydroxide slurry as a hydrolyzing medium in carrying out the above-mentioned selective hydrolysis reaction, although either a calcium hydroxide solution or a solution or slurry of any other alkaline earth metal hydroxide may be used instead.

It is important that the hydrolysis mixture be agitated sufficiently so that the hydrogen chloride, which is produced in the reaction, is neutralized as rapidly as it is formed. If conditions of acid hydrolysis exist within the mixture, a portion of the polychlorinated products (e. g. dichloro-isobutanes) is liable to be decomposed into hydrogen chloride and chloro-isobutylenes and, further, metal equipment in contact with the hydrolysis mixture is liable to be corroded.

Conditions of strong alkalinity should be avoided within the hydrolysis mixture, as the hydrolysis proceeds slowly and decomposition of tertiary-butyl chloride into isobutylene and hydrogen chloride is liable to occur under such conditions. Calcium hydroxide, being relatively inexpensive and but slightly soluble in water, is ideally suited to the purpose and can be employed in the form of a heavy slurry thereof without obtaining conditions of strong alkalinity in the hydrolyzing solution. The following description, then, will be directed particularly to the employment of calcium hydroxide as a hydrolyzing agent, but it is to be understood that other alkaline earth metal hydroxides may be employed instead.

To the accomplishment of the foregoing and related ends, the invention, then, consists of the method hereinafter fully described and particularly pointed out in the claims, the annexed drawing and the following description setting forth in detail but several of the various ways in which the principle of the invention may be used.

The annexed drawing is a flow sheet setting forth a preferred combination of operations which may be carried out in practicing our invention. In operating according to the procedure set forth diagrammatically in said drawing, isobutane is chlorinated according to the method described in the aforementioned co-pending application, Serial No. 636,996, to obtain a reaction mixture consisting substantially of unreacted isobutane, hydrogen chloride, isobutyl chloride, tertiary-butyl chloride, and polychlorinated products.

The reacted mixture is passed through a cooling apparatus wherein a considerable portion of the chlorinated products is condensed and separated and wherein the residual vapors are cooled to a temperature below 30° C. and preferably below 20° C. Hydrogen chloride is then extracted from the residual vapor mixture by scrubbing the latter with water at a temperature below about 30° C. If the temperature materially exceeds 30° C. during such scrubbing operation, a considerable portion of the tertiary-butyl chloride contained in the vapors is liable to be lost through hydrolysis and decomposition thereof. During the scrubbing operation, a small quantity of residual chlorinated products may be condensed from the vapors. Such condensed material is separated from the wash water and is combined with the chlorinated products which were condensed during the cooling operation. The resultant liquid mixture, together with the residual vapor mixture, is passed into a hydrolyzer fitted with a distilling column and containing an aqueous solution or slurry of calcium hydroxide.

During hydrolysis, the hydrolyzing medium is agitated and maintained at a temperature between 30° C. and 100° C., preferably between 30° C. and 70° C., and vapors above said bath pass from the hydrolyzer through the distilling column, which preferably is maintained at such temperature as to obtain an efficient isobutane reflux. The vapors issuing from the distilling column, which consist substantially of unreacted isobutane, are returned to the chlorinator. In order to maintain such isobutane reflux and separate unreacted isobutane effectively from other components of the mixture present in the hydrolyzer, we prefer to maintain vapors present both in the hydrolyzer and in the distilling column under a pressure above about 5 pounds per square inch, gauge. When such mixture is maintained at 20 pounds pressure, gauge, we have found the isobutane to reflux efficiently at about 10° C.

After the calcium hydroxide in the hydrolyzing bath is nearly exhausted, the liquid mixture is withdrawn from the hydrolyzer, filtered to remove any solid materials which may be present, and the filtrate is passed through a continuous extractor wherein tertiary-butyl alcohol is extracted with water from the isobutyl chloride. In carrying out such extraction, sufficient water should be used so that isobutyl chloride and any polychlorinated products present are rendered practically insoluble in the aqueous alcohol extracts.

The aqueous extracts are fractionally distilled to obtain an aqueous tertiary-butyl alcohol solution, usually containing approximately 86 per cent by weight of tertiary-butyl alcohol. The alcohol product may be dehydrated in any of the usual ways, e. g. over calcium oxide or other dehydrating agent, and be distilled to obtain substantially pure tertiary-butyl alcohol. We have found, however, that the aqueous alcohol can conveniently be dehydrated by dissolving therewith an alkyl chloride (e. g. isobutyl chloride, secondary butyl chloride, propyl chloride, etc.) having a boiling point lower than that of tertiary-butyl alcohol, and distilling a mixture of the alkyl chloride and water from the alcohol. Such alkyl chloride and water form a relatively low boiling mixture which can be distilled from the tertiary-butyl alcohol to leave the latter in anhydrous and substantially pure form. During such distillation, we prefer continuously to separate the aqueous layer of the distillate from the alkyl chloride layer thereof and to recycle the latter through the distilling operation until all water is removed from the alcohol. The aqueous layer of the above distillate usually contains a small quantity of tertiary-butyl alcohol and can economically be combined with the crude mixture obtained through hydrolyzing another batch of chlorinated isobutane. The isobutyl chloride layer from which tertiary-butyl alcohol was extracted is fractionally distilled to obtain substantially pure isobutyl chloride.

If either of the above-mentioned distillations are carried out in metal equipment, it is preferable that an aqueous solution or slurry of an alkaline earth metal hydroxide be present in the distilling mixture. Otherwise, polychlorinated products which may be present are liable to be decomposed into hydrogen chloride and chloroisobutylenes. Sufficient alkaline earth metal hydroxide is used to maintain the distilling mixture in a slightly alkaline condition.

Instead of operating in the manner described above, the step of scrubbing the crude chlorination mixture with water to remove hydrogen chloride therefrom may be omitted from the process and such crude mixture may be passed directly into an aqueous calcium hydroxide solution or slurry containing sufficient calcium hydroxide both to neutralize the hydrogen chloride and to hydrolyze the tertiary-butyl chloride present in said chlorination mixture. The hydrolysis itself is carried out under conditions similar to those already described, i. e. the hydrolyzing mixture is maintained at a temperature between about 30° and 100° C. and is agitated sufficiently so that conditions of neutral or alkaline hydrolysis are maintained throughout the mixture.

Instead of filtering the crude hydrolyzed mixture to separate solids therefrom prior to carrying out the previously mentioned extraction operation, organic materials can be steam distilled from such hydrolyzed mixture and the distillate can be passed through the extractor. Again, if desired, tertiary-butyl alcohol can be extracted from the crude hydrolyzed mixture without removing solids from the latter, but the extraction can be carried out more efficiently if no solids are present.

Instead of extracting tertiary-butyl alcohol from the crude hydrolyzed mixture, the latter, which usually contains a small quantity of unreacted calcium hydroxide, can also be fractionally distilled directly to separate isobutyl chloride and tertiary-butyl alcohol therefrom. When an anhydrous mixture of isobutyl chloride and tertiary-butyl alcohol is fractionally distilled, said compounds tend to distill together so that a complete separation of the individual compounds cannot readily be attained through such procedure. When a mixture containing water, isobutyl chloride, and tertiary-butyl alcohol is fractionally distilled, however, we have found that the water and isobutyl chloride distill over together at temperatures considerably below the boiling point of tertiary-butyl alcohol; hence, separation of the organic components of the mixture through such procedure is relatively easy. For reasons previously mentioned, if such distillation is carried out in metal equipment, the distilling mixture should contain a sufficient quantity of an alkaline earth metal hydroxide to maintain said mixture in slightly alkaline condition.

The following examples set forth several ways in which the principle of our invention has been employed. It is to be understood, however, that said examples are purely illustrative and are not to be construed as a limitation on the invention.

*Example 1*

Into a reactor provided with a mechanical stirrer, an inlet for reactants and an efficient distilling column was placed a mixture consisting of 75.8 pounds of calcium hydroxide and 402 pounds of water. The mixture was stirred and maintained at about 50° C. for 1.5 hours, during which period a solution consisting of 172 pounds of tertiary-butyl chloride, 208 pounds of isobutyl chloride, and 20 pounds of isobutylene, was gradually introduced thereto. During the introduction, the reactor and the distilling column were maintained under a pressure of about 10 pounds per square inch, gauge, the distilling column was cooled to about 0° C. with brine, and isobutylene was fractionally distilled from the reaction mixture. After all of the chlorinated hydrocarbon mixture had been passed into the reactor, the liquid hydrolysis mixture was permitted to settle and the aqueous and organic layers thereof were separated. The organic layer was extracted with three successive portions of water, each such portion representing approximately the volume of the organic layer to be treated therewith. The aqueous extracts were combined with the aqueous layer of the hydrolysis mixture and the entire solution was fractionally distilled under atmospheric pressure. The fraction distilling over at between 78° and 86° C. was collected and consisted of 141.6 pounds of an aqueous 86 per cent tertiary-butyl alcohol solution. To the organic layer, which had been extracted with water, was added 2 pounds of calcium hydroxide and 10 gallons of water and the entire mixture was fractionally distilled to obtain 181 pounds of substantially pure isobutyl chloride.

*Example 2*

Into a reactor similar to that described in Example 1 were placed 52 pounds of calcium hydroxide and 202 pounds of water. The mixture was stirred and maintained at 50° C. for 2 hours, during which period a solution of 86.5 pounds of tertiary-butyl chloride, 274 pounds of isobutyl chloride, 20 pounds of polychlorinated hydrocarbons, and 20 pounds of isobutane was gradually introduced thereto. The reactor and the distilling column were maintained under approximately 10 pounds per square inch pressure, gauge, the column was cooled to about 0° C. by a flow of cold brine over the outer surface thereof, and isobutane was fractionally distilled from the hydrolysis mixture during the course of the reaction. After all of the chlorination mixture had been introduced into the reactor, the liquid hydrolysis mixture was allowed to settle and the aqueous and organic layers thereof were separated. The organic layer was extracted with three separate portions of water, each such water portion representing approximately the volume of the organic layer to be treated therewith. The aqueous extracts were combined with the aqueous layer of the hydrolysis mixture and the entire mixture was fractionally distilled under atmospheric pressure to obtain 60.8 pounds of an aqueous 86 per cent tertiary-butyl alcohol solution. The organic layer which had been extracted with water was mixed with approximately 2 pounds of calcium hydroxide and 10 gallons of water and the mixture was fractionally distilled. The following fractions were collected:—A fraction distilling over at from 58° to 66° C. containing 232.5 pounds of isobutyl chloride; a fraction distilling over at from 66° to 86° C. containing 13.85 pounds of isobutyl chloride and 13.6 pounds of polychlorinated butanes, and a fraction distilling over at from 86° to 100° C. containing 0.4 pound of isobutyl chloride and 4.6 pounds of polychlorinated butanes.

*Example 3*

In a reactor provided with a mechanical stirrer, an inlet for reactants, and an efficient distilling column, were placed 78 pounds of calcium hydroxide and 420 pounds of water. The calcium hydroxide slurry was stirred and maintained at about 50° C. for 1.5 hours, during which period 400 pounds of a chlorinated isobutane solution containing 20 pounds of isobutylene, 180 pounds of tertiary-butyl chloride, and 200 pounds of isobutyl chloride was gradually introduced into the reactor at a point below the surface of the stirred mixture. During the above-mentioned period, the reactor and the distilling column were maintained under a vapor pressure of approximately 10 pounds per square inch, gauge, the distilling column was cooled to about 0° C. by a flow of brine over the outer surface thereof, and the isobutylene was fractionally distilled from the reaction mixture. After all of the chlorinated mixture had been introduced into the reactor, the entire liquid reaction mixture was fractionally distilled under atmospheric pressure until a distilling temperature of 86° C. was reached. During said distillation, the aqueous layer of the distillate was continuously separated and returned to the still through the distilling column. The following fractions of distillate were collected:—(1) a lower fraction distilling over at from 58° to 66° C. containing 165.6 pounds of isobutyl chloride, 18.4 pounds of tertiary-butyl alcohol, and 3.7 pounds of water; an intermediate fraction distilling over at from 66° to 76° C. containing 9.2 pounds of isobutyl chloride, 5.4 pounds of tertiary-butyl alcohol, and 0.7 pound of water; and an upper fraction distilling over at from 76° to 86° C. consisting of 120.8 pounds of aqueous 86 per cent tertiary-butyl alcohol.

The above described procedure may be varied in details without departing from the scope of the invention. For instance, the initial operation of cooling a chlorinated isobutane mixture may be carried out either under a sufficiently greater pressure, or at a sufficiently lower temperature, or both, than is the subsequent operation of scrubbing hydrogen chloride from the residual vapors with water, so that no chlorinated hydrocarbon products are condensed during said scrubbing operation. Through operating in such manner, the step of separating condensed chlorination products from the scrubbing water is eliminated from the process.

Again, although we prefer to carry the selective hydrolysis operation out under superatmospheric pressure so as to render more convenient the step of fractionally distilling isobutane or isobutylene from the hydrolysis mixture during the course of the reaction, such hydrolysis operation can be carried out under atmospheric or even under subatmospheric pressure. If desired, the gaseous components of a crude chlorinated isobutane mixture can be fractionally distilled or otherwise separated from the chlorinated isobutane products prior to carrying out the hydrolysis operation and the latter may conveniently be carried out under either atmospheric or superatmospheric pressure.

The foregoing description and examples have been restricted to the employment of a chlorinated isobutane mixture which initially is substantially free of chloro-isobutylenes. If a chlorinated isobutane mixture which initially contains chloro-isobutylenes is treated according to such procedure, the isobutyl chloride and tertiary-butyl alcohol products may be contaminated with chloro-isobutylenes or unsaturated derivatives thereof, e. g. hydroxy-isobutylene, isobutyraldehyde, etc. Such impurities may be removed from either of said products by treating the latter with a sufficient quantity of an oxidizing agent, e. g. chlorine, sodium hypochlorite, calcium hypochlorite, potassium permanganate, sodium dichromate, etc., to react with said impurities and thereafter fractionally distilling the mixture in the presence of an aqueous alkaline earth metal hydroxide. As alternative procedure, a chlorinated isobutane mixture containing chloro-isobutylenes can be further chlorinated at a temperature below 200° C. (preferably at or near room temperature) with sufficient chlorine to react with the chloro-isobutylenes and the resultant mixture can then be hydrolyzed and fractionally distilled according to procedure heretofore described to obtain isobutyl chloride and tertiary-butyl alcohol as substantially the pure compounds.

Our invention is not restricted to the employment of a crude mixture obtained through the direct chlorination of isobutane. We may employ the present method to obtain isobutyl chloride and tertiary-butyl alcohol from any mixture containing isobutyl and tertiary-butyl chlorides and we have employed the herein-described method to obtain said products from the crude mixture resulting from the thermal molecular rearrangement of substantially pure isobutyl chloride. Further, the step of hydrolyzing tertiary-butyl chloride and the successive steps of separating tertiary-butyl alcohol from the hydrolyzed mixture can advantageously be employed in producing tertiary-butyl alcohol from substantially pure tertiary-butyl chloride.

The present invention, in brief, comprises hydrolyzing tertiary-butyl chloride with an aqueous alkaline earth metal hydroxide to obtain tertiary-butyl alcohol and the invention more particularly comprises treating a mixture containing isobutyl and tertiary-butyl chlorides with an aqueous alkaline earth metal hydroxide to selectively hydrolyze the tertiary-butyl chloride, and separating both isobutyl chloride and tertiary-butyl alcohol from the hydrolyzed mixture.

Other modes of applying the principle of our invention may be employed instead of those explained, change being made as regards the method herein explained, provided the step or steps stated by any of the following claims or the equivalent of such stated step or steps be employed.

We therefore particularly point out and distinctly claim as our invention:—

1. The method which comprises reacting tertiary-butyl chloride with an aqueous alkaline earth metal hydroxide to form tertiary-butyl alcohol.

2. The method which comprises reacting tertiary-butyl chloride with aqueous calcium hydroxide at a temperature between about 30° and about 100° C., whereby tertiary-butyl alcohol is formed.

3. The method which comprises treating a mixture containing isobutyl chloride and tertiary-butyl chloride with an aqueous alkaline earth metal hydroxide at a temperature between about 30° and about 100° C., whereby tertiary-butyl chloride contained in the mixture is selectively hydrolyzed to form tertiary-butyl alcohol.

4. The method which comprises treating a mixture containing isobutyl chloride and tertiary-butyl chloride, at a temperature between about 30° and about 100° C., with a sufficient quantity of aqueous calcium hydroxide to maintain the mixture in alkaline condition during the course of the reaction which ensues, and separating isobutyl chloride and tertiary-butyl alcohol from the reacted mixture.

5. The method which comprises treating a mixture containing isobutyl chloride and tertiary-butyl chloride, at a temperature between about 30° and about 70° C., with a sufficient quantity of aqueous calcium hydroxide to maintain the mixture in alkaline condition during the course of the reaction which ensues, stirring the mixture during the course of such reaction, and fractionally distilling the reacted mixture to separate isobutyl chloride and tertiary-butyl alcohol therefrom.

6. The method which comprises treating a mixture containing isobutyl chloride and tertiary-butyl chloride, at a temperature between about 30° and about 100° C., with a sufficient quantity of an aqueous alkaline earth metal hydroxide to maintain the mixture in alkaline condition during the course of the reaction which ensues, stirring the mixture during the course of such reaction, and extracting tertiary-butyl alcohol from the water-insoluble components of the reacted mixture with water.

7. The method which comprises treating a mixture containing isobutyl chloride and tertiary-butyl chloride, at a temperature between about 30° and about 70° C., with a sufficient quantity of aqueous calcium hydroxide to maintain the mixture in alkaline condition during the course of the reaction which ensues, stirring the mixture during the course of such reaction, extracting the reacted mixture with water to separate tertiary-butyl alcohol therefrom, fractionally distilling the aqueous extract to obtain aqueous tertiary-butyl alcohol in the form of a relatively concentrated solution thereof, and dehydrating the tertiary-butyl alcohol.

8. The method which comprises treating a mixture containing isobutyl chloride and tertiary-butyl chloride, at a temperature between about 30° and about 70° C., with a sufficient quantity of aqueous calcium hydroxide to maintain the mixture in alkaline condition during the course of the reaction which ensues, stirring the mixture during the course of such reaction, extracting the reacted mixture with water to separate tertiary-butyl alcohol therefrom, fractionally distilling the aqueous extract to obtain aqueous tertiary-butyl alcohol in a relatively concentrated form, adding to the aqueous tertiary-butyl alcohol an alkyl chloride having a boiling point below that of said alcohol, and fractionally distilling a mixture of water and the alkyl chloride from the tertiary-butyl alcohol to render the latter substantially anhydrous.

9. The method which comprises treating a mixture containing isobutyl chloride, tertiary-butyl chloride, and a relatively low boiling compound selected from the class consisting of isobutane and isobutylene, under superatmospheric pressure and at a temperature between about 30° and 100° C., with an aqueous alkaline earth metal hydroxide in amount sufficient to maintain the mixture in alkaline condition, stirring the mixture during the course of the reaction which ensues, and fractionally distilling the above-mentioned relatively low boiling compound from the mixture during the course of such reaction.

10. The method which comprises treating a mixture containing isobutyl chloride, tertiary-butyl chloride, and a relatively low boiling compound selected from the class consisting of isobutane and isobutylene, under superatmospheric pressure and at a temperature between about 30° and about 70° C., with aqueous calcium hydroxide in amount sufficient to maintain the mixture in alkaline condition, stirring the mixture during the course of the reaction which ensues, fractionally distilling the above-mentioned relatively low boiling compound from the mixture during the course of said reaction, and separating isobutyl chloride and tertiary-butyl alcohol from the reacted mixture.

11. The method which comprises treating a mixture containing isobutyl chloride, tertiary-butyl chloride, a dichloro-isobutane, and a relatively low boiling compound selected from the class consisting of isobutane and isobutylene, under superatmospheric pressure and at a temperature between about 30° and about 70° C., with aqueous calcium hydroxide in amount sufficient to maintain the mixture in alkaline condition, stirring the mixture during the course of the reaction which ensues, fractionally distilling the above-mentioned relatively low boiling compound from the mixture during the course of said reaction, extracting tertiary-butyl alcohol from the reacted mixture with water, and fractionally distilling the aqueous extract to obtain aqueous tertiary-butyl alcohol in relatively concentrated form.

12. The method which comprises treating a mixture containing isobutyl chloride, tertiary-butyl chloride, a dichloro-isobutane, a chloro-isobutylene, and a relatively low boiling compound selected from the class consisting of isobutane and isobutylene, under superatmospheric pressure and at a temperature between about 30° and about 70° C., with aqueous calcium hydroxide in amount sufficient to maintain the mixture in alkaline condition, stirring the mixture during the course of the reaction which ensues, fractionally distilling the above-mentioned relatively low boiling compound from the mixture during the course of said reaction, treating the reacted mixture with a strong oxidizing agent in amount sufficient to react with unsaturated compounds present in said mixture, extracting tertiary-butyl alcohol from the mixture with water, rendering the aqueous extract alkaline with an alkaline earth metal hydroxide, and fractionally distilling aqueous tertiary-butyl alcohol from the resultant alkaline mixture.

13. The method which comprises treating a crude chlorinated isobutane mixture, containing tertiary butyl chloride, isobutyl chloride, polychlorinated isobutane, chloro-isobutylene, isobutylene, and unreacted isobutane, under superatmospheric pressure and at a temperature between about 30° and about 70° C., with aqueous calcium hydroxide in amount sufficient to maintain the mixture in alkaline condition, stirring the mixture during the course of the reaction which ensues, fractionally distilling isobutylene and unreacted isobutane from the mixture during the course of said reaction, treating the reacted mixture with sufficient chlorine to react with unsaturated compounds present in said mixture, extracting tertiary-butyl alcohol from the mixture with water, rendering the aqueous tertiary-butyl alcohol extract alkaline with an alkaline earth metal hydroxide, fractionally distilling the resultant alkaline mixture to separate a relatively concentrated aqueous tertiary-butyl alcohol solution therefrom, adding to said relatively concentrated aqueous tertiary-butyl alcohol an alkyl chloride having a boiling point lower than that of tertiary-butyl alcohol, and fractionally distilling a mixture of water and the alkyl chloride from the alcohol to render the latter substantially anhydrous.

14. In a method for obtaining isobutyl chloride, the step which consists in fractionally distilling isobutyl chloride from a mixture containing said compound, a dichloro-isobutane, and a sufficient quantity of an aqueous alkaline earth metal hydroxide to maintain the mixture in alkaline condition.

15. In a method for obtaining tertiary-butyl alcohol, the step which consists in distilling aqueous tertiary-butyl alcohol from a mixture containing said compound, a dichloro-isobutane, and a sufficient quantity of an aqueous alkaline earth metal hydroxide to maintain the mixture in alkaline condition.

16. The method of dehydrating aqueous tertiary-butyl alcohol which comprises mixing the same with an alkyl chloride having a boiling point lower than tertiary-butyl alcohol, and fractionally distilling a mixture containing water and said alkyl chloride from the alcohol.

17. The method of dehydrating aqueous tertiary-butyl alcohol which comprises mixing the same with a relatively small quantity of isobutyl chloride, fractionally distilling a mixture containing water and isobutyl chloride from the alcohol, continuously separating the aqueous layer of the distillate from the isobutyl chloride layer thereof, and continuously recycling the latter through the process until the main body of tertiary-butyl alcohol is rendered substantially anhydrous.

18. In a method for obtaining isobutyl chloride, the steps which consist in purifying isobutyl chloride which contains impurities of the class consisting of chloro-isobutylenes and unsaturated hydrolysis and oxidation products of chloro-isobutylenes by treating such impure isobutyl chloride with a sufficient quantity of a strong oxidizing agent to react with the impurities, adding a sufficient quantity of an aqueous alkaline earth metal hydroxide to render the mixture alkaline, and fractionally distilling isobutyl chloride from the alkaline mixture.

19. In a method for obtaining tertiary-butyl alcohol, the steps which consist in purifying tertiary-butyl alcohol which contains impurities of the class consisting of chloro-isobutylenes and unsaturated hydrolysis and oxidation products of chloro-isobutylene, by treating such impure tertiary-butyl alcohol with a sufficient quantity of a strong oxidizing agent to react with the impurities, adding a sufficient quantity of an aqueous alkaline earth metal hydroxide to render the mixture alkaline, and distilling aqueous tertiary-butyl alcohol from the alkaline mixture.

20. In a method for obtaining tertiary-butyl alcohol, the steps which consist in purifying tertiary-butyl alcohol which contains impurities of the class consisting of chloro-isobutylenes and unsaturated hydrolysis and oxidation products of chloro-isobutylene by adding a sufficient quantity of an aqueous alkaline earth metal hydroxide to the impure tertiary-butyl alcohol to render the latter alkaline, treating the alkaline mixture with sufficient chlorine to react with the unsaturated impurities contained therein and fractionally distilling aqueous tertiary-butyl alcohol from the chlorinated mixture.

EDGAR C. BRITTON.
GERALD H. COLEMAN.
GLENN W. WARREN.